US012560552B2

(12) United States Patent
Schlezinger

(10) Patent No.: US 12,560,552 B2
(45) Date of Patent: Feb. 24, 2026

(54) COMPACT APPARATUS FOR BATCH VIAL INSPECTION

(71) Applicant: Applied Materials, Inc., Santa Clara, CA (US)

(72) Inventor: Asaf Schlezinger, Modiin (IL)

(73) Assignee: Applied Materials Inc., Santa Clara, CA (US)

( * ) Notice: Subject to any disclaimer, the term of this patent is extended or adjusted under 35 U.S.C. 154(b) by 0 days.

(21) Appl. No.: 18/653,971

(22) Filed: May 2, 2024

(65) Prior Publication Data

US 2024/0295503 A1 Sep. 5, 2024

Related U.S. Application Data

(63) Continuation of application No. 17/510,185, filed on Oct. 25, 2021, now Pat. No. 12,007,334.

(51) Int. Cl.
*G01N 21/90* (2006.01)
*G01N 35/04* (2006.01)

(52) U.S. Cl.
CPC ......... *G01N 21/9009* (2013.01); *G01N 35/04* (2013.01); *G01N 2035/0406* (2013.01); *G01N 2035/0415* (2013.01); *G01N 2201/0484* (2013.01); *G01N 2201/0636* (2013.01)

(58) Field of Classification Search
CPC ... G01N 2035/0406; G01N 2035/0415; G01N 21/9009; G01N 21/9027; G01N 21/9036; G01N 2201/0484; G01N 2201/0636; G01N 35/0099; G01N 35/04
See application file for complete search history.

(56) References Cited

U.S. PATENT DOCUMENTS 7,390,991 B1 * 6/2008 Agnello ................. A21B 5/026
198/465.2
2014/0177932 A1 6/2014 Milne et al.
2014/0294238 A1 10/2014 Kolb
(Continued)

FOREIGN PATENT DOCUMENTS

CN 103353458 A 10/2013
CN 203385679 U 1/2014
(Continued)

OTHER PUBLICATIONS

Machine translation of Chen et al. CN 103353458, Oct. 2013.
(Continued)

*Primary Examiner* — Peter B Kim
(74) *Attorney, Agent, or Firm* — Moser Taboada

(57) ABSTRACT

Methods and apparatus of inspection tools for inspecting impurities in vials are provided herein. In some embodiments, an inspection tool for inspecting impurities in vials includes: a motor; a plurality of carts configured to move via the motor to selectively place each of the plurality of carts in an inspection position, wherein each of the plurality of carts includes a vial holder configured to hold a plurality of vials, and wherein each vial holder is configured to spin the plurality of vials on their own respective axes; and a camera configured to take an image of at least one of the plurality of vials of a corresponding cart of the plurality of carts when the corresponding cart is disposed in the inspection position.

20 Claims, 7 Drawing Sheets

(56)            References Cited

U.S. PATENT DOCUMENTS

| | | |
|---|---|---|
| 2015/0289565 A1 | 10/2015 | Cadieux et al. |
| 2016/0271858 A1* | 9/2016 | Diesnis ................... B29C 49/46 |
| 2017/0097305 A1 | 4/2017 | Prinz |
| 2018/0172602 A1 | 6/2018 | Beck |
| 2020/0018774 A1* | 1/2020 | Masuya ................. G01N 35/02 |
| 2020/0346791 A1 | 11/2020 | Sorrentino et al. |
| 2022/0214270 A1* | 7/2022 | Pedrazzini ........... G01N 21/314 |

FOREIGN PATENT DOCUMENTS

| | | | | |
|---|---|---|---|---|
| EP | 4549328 A2 * | 5/2025 | ............. | B65B 57/08 |
| GB | 1448139 A | 9/1976 | | |
| JP | 2002214153 A | 7/2002 | | |
| JP | 2013-134101 A | 7/2013 | | |

OTHER PUBLICATIONS

International Search Report for PCT/US2022/047697, dated Feb. 27, 2023.
European Search Report for EP 22 88 8045 dated Jul. 21, 2025.

* cited by examiner

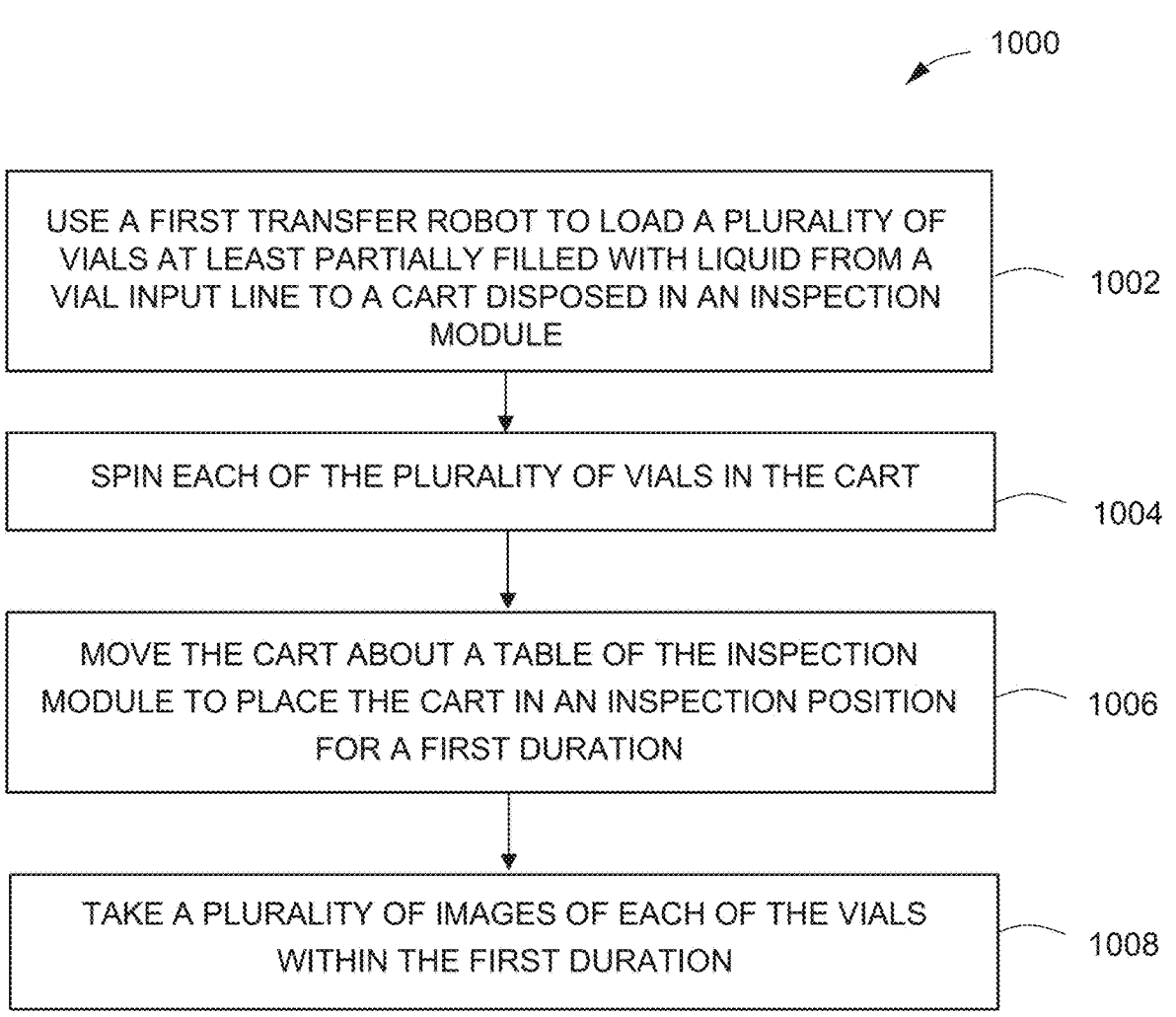

1000

USE A FIRST TRANSFER ROBOT TO LOAD A PLURALITY OF VIALS AT LEAST PARTIALLY FILLED WITH LIQUID FROM A VIAL INPUT LINE TO A CART DISPOSED IN AN INSPECTION MODULE

1002

SPIN EACH OF THE PLURALITY OF VIALS IN THE CART

1004

MOVE THE CART ABOUT A TABLE OF THE INSPECTION MODULE TO PLACE THE CART IN AN INSPECTION POSITION FOR A FIRST DURATION

1006

TAKE A PLURALITY OF IMAGES OF EACH OF THE VIALS WITHIN THE FIRST DURATION

COMPACT APPARATUS FOR BATCH VIAL INSPECTION

CROSS-REFERENCE TO RELATED APPLICATIONS

This application claims benefit of U.S. patent application Ser. No. 17/510,185, filed Oct. 25, 2021 which is herein incorporated by reference in its entirety.

FIELD

Embodiments of the present disclosure generally relate to equipment for inspecting vials for impurities.

BACKGROUND

Parenteral drugs are inspected prior to being administered to ensure that there are no foreign objects in the liquid inside a prefilled glass container. Parenteral drugs disposed in prefilled glass containers such as vials, syringes, or ampules are typically inspected by an operator or automated inspection tools. Conventional automated inspection tools employ a turning turret that runs at high speeds. However, such inspection tools are costly, complex, and require a large footprint.

Conventional automated inspection tools generally load the prefilled glass containers in pockets of a turret. For example, the prefilled glass containers are spun constantly within the pocket while the turret is also spinning. However, because the turret is spinning, cameras need to track the containers to take multiple images, adding to the cost and complexity of the inspection tool.

Accordingly, the inventor has provided improved apparatus and methods for inspecting a plurality of vials for impurities.

SUMMARY

Methods and apparatus of inspection tools for inspecting impurities in vials are provided herein. In some embodiments, an inspection tool for inspecting impurities in vials includes: a motor; a plurality of carts configured to move via the motor to selectively place each of the plurality of carts in an inspection position, wherein each of the plurality of carts includes a vial holder configured to hold a plurality of vials, and wherein each vial holder is configured to spin the plurality of vials on their own respective axes; and a camera configured to take an image of at least one of the plurality of vials of a corresponding cart of the plurality of carts when the corresponding cart is disposed in the inspection position.

In some embodiments, a method of inspecting a plurality of vials for impurities, includes loading a plurality of vials at least partially filled with liquid from a vial input line to a cart of a plurality of carts; spinning each of the plurality of vials in the cart about their own respective axes; moving the cart via a motor to place the cart in an inspection position for a first duration, wherein the cart is stationary during the first duration; and taking an image of at least one of the plurality of vials within the first duration with a camera.

In some embodiments, a non-transitory computer readable medium having instructions stored thereon that, when executed, causes a method of inspecting a plurality of vials for impurities to be performed, the method comprising: loading a plurality of vials at least partially filled with liquid from a vial input line to a cart of a plurality of carts; spinning each of the plurality of vials in the cart about their own respective axes; moving the cart via a motor to place the cart in an inspection position for a first duration, wherein the cart is stationary during the first duration; and taking an image of at least one of the plurality of vials within the first duration with a camera.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

FIG. 10 depicts a flow chart of a method of inspecting a plurality of vials for impurities in accordance with at least some embodiments of the present disclosure.

Figure 1:
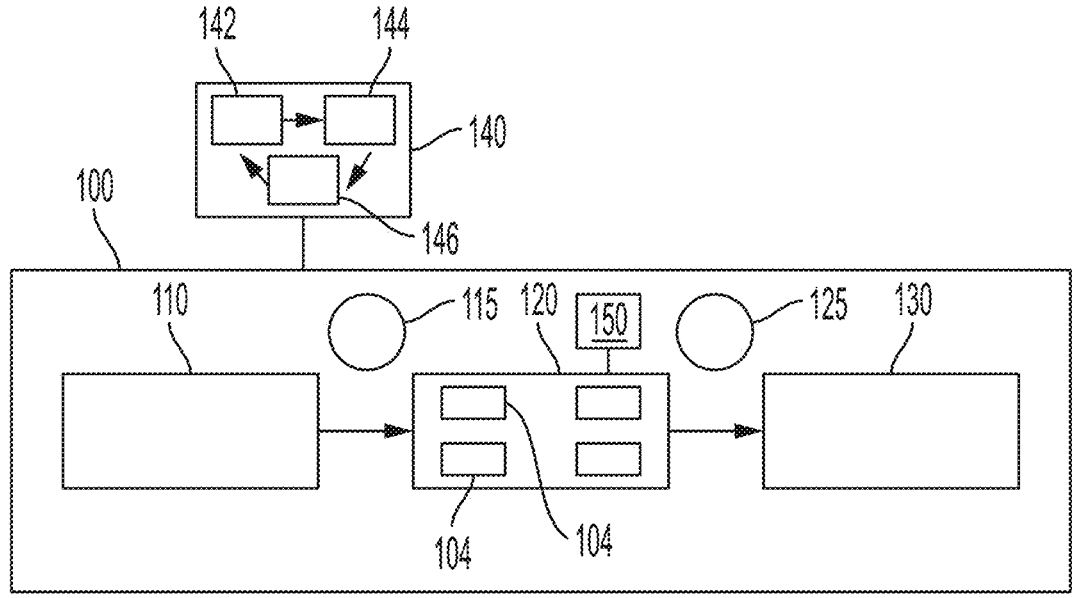
FIG. 1 depicts a schematic view of an inspection tool for inspecting impurities in vials in accordance with at least some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of inspection tools for inspecting a plurality of vials for impurities are provided herein. The embodiments of inspection tools described herein advantageously provide batch inspection of vials in a stop-and-go mode. The inspection tool generally includes a table for supporting a plurality of carts. Each of the plurality of carts include vial holders for holding respective batches of the plurality of vials. A batch of the plurality of vials may be loaded onto a cart when the cart is in a loading position. The batch of the plurality of vials may be inspected when the cart is in an inspection position. A camera or image processing unit is configured to take images of each batch of the plurality of vials and inspect or evaluate if any vial of each bath includes impurities. Data from inspection of the batch of the plurality vials may be processed when the cart is in a data processing position. The batch of the plurality of vials may be unloaded from the cart when inspection and data processing is complete. The embodiments of inspection tools provided herein advantageously provide a small footprint, provide ease of cleaning, for example, when spillage occurs, and provide easy maintenance. While the term vial is typically used herein, vials refer to any format of parenteral packaging such as prefilled syringes, cartridges, ampules, or any other suitable prefilled glass container.

FIG. 1 depicts a schematic view of an inspection tool 100 for inspecting impurities in vials in accordance with at least some embodiments of the present disclosure. The inspection tool 100 generally includes an inspection module 120 for supporting a plurality of vials on a plurality of carts 104 and inspecting the plurality of vials. Each of the plurality of carts 104 are configured to hold a batch of the plurality of vials. The inspection tool 100 further includes a vial input line 110 and a vial output line 130. In some embodiments, the inspection tool 100 includes a first transfer robot 115 configured to transfer a plurality of vials to be inspected from the vial input line 110 to the one or more carts 104 for inspection. In some embodiments, the inspection tool 100 includes a second transfer robot 125 configured to transfer the plurality of vials from the one or more carts 104 to the vial output line 130. In some embodiments, the inspection tool 100 may include additional transfer robots for increased throughput.

The vial input line 110 may comprise a conveyor configured to deliver a plurality of vials to be inspected towards the inspection module 120. The vial output line 130 may comprise a conveyor configured to deliver a plurality of vials that have been inspected away from the inspection module 120. In some embodiments, the vial output line 130 is disposed on a side of the inspection module 120 opposite the vial input line 110.

The inspection module 120 includes a camera 150 configured to take images of the plurality of vials that may be used for inspection and vial characterization. The inspection tool 100 may include a controller 140 to control the operation of the inspection tool 100. The controller 140 generally includes a central processing unit (CPU) 142, a memory 144, and a support circuit 146. The CPU 142 may be one of any form of a general-purpose computer processor that can be used in an industrial setting. The support circuit 146 is conventionally coupled to the CPU 142 and may comprise a cache, clock circuits, input/output subsystems, power supplies, and the like. Software routines, such as processing methods as described above may be stored in the memory 144 and, when executed by the CPU 142, transform the CPU 142 into a controller 140. The software routines may also be stored and/or executed by a second controller (not shown) that is located remotely from the inspection tool 100.

In operation, the controller 140 enables data collection and feedback from the inspection tool 100 to optimize performance of the inspection tool 100 and provides instructions to system components. For example, the controller 140 may detect and classify impurities or defects found in the plurality of vials and provide instruction on separating rejected vials (vials with internal impurities) of the plurality of vials from the accepted vials (vials with no internal impurities detected) of the plurality of vials. The memory 144 can be a non-transitory computer readable storage medium having instructions that when executed by the CPU 142 (or controller 140) perform the methods described herein.

Embodiments in accordance with the present disclosure may be implemented in hardware, firmware, software, or any combination thereof. Embodiments may also be implemented as instructions stored using one or more computer readable media, which may be read and executed by one or more processors. A computer readable medium may include any mechanism for storing or transmitting information in a form readable by a machine (e.g., a computing platform or a "virtual machine" running on one or more computing platforms). For example, a computer readable medium may include any suitable form of volatile or non-volatile memory. In some embodiments, the computer readable media may include a non-transitory computer readable medium.

Figure 2:
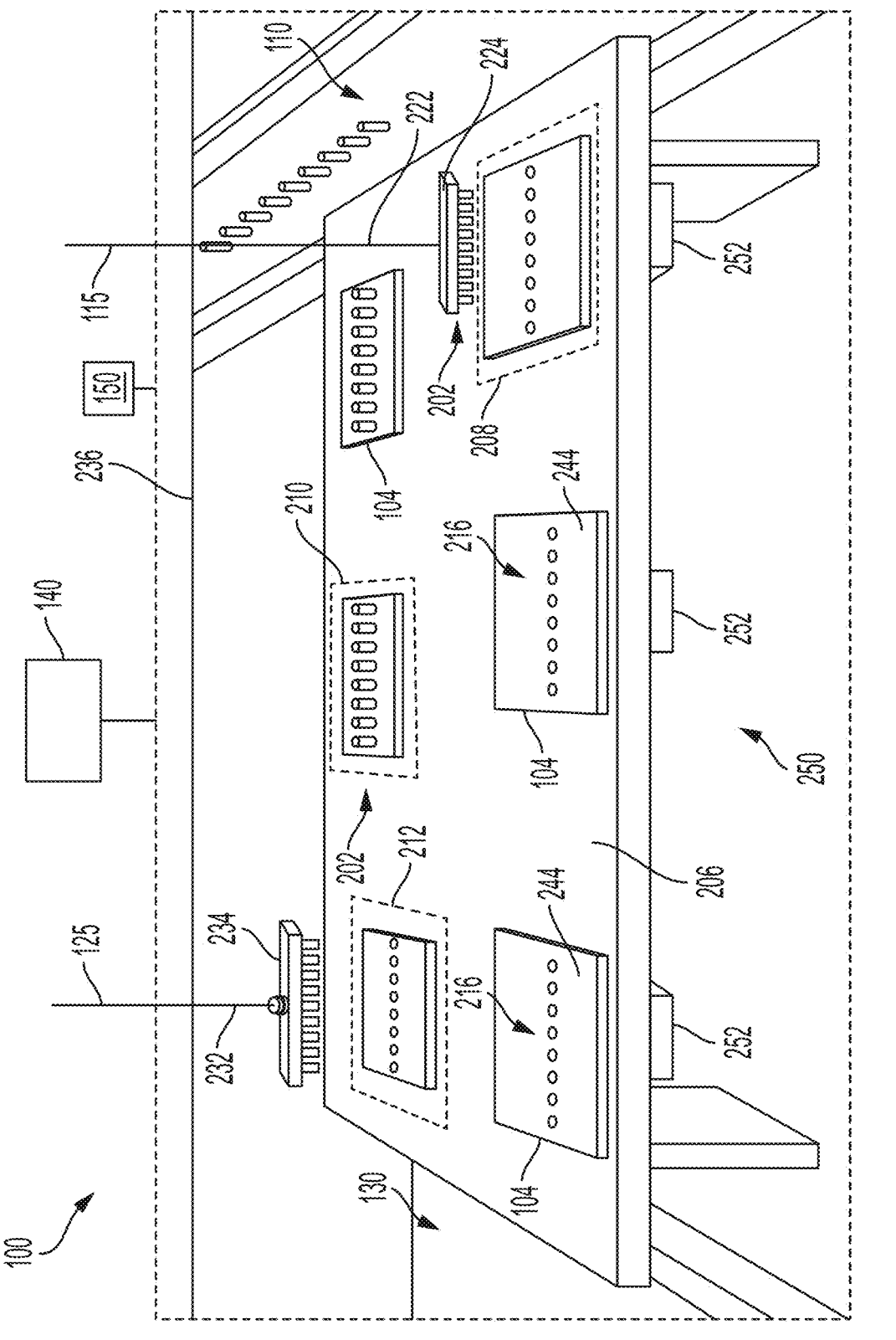
FIG. 2 depicts a schematic view of an inspection tool comprising a maglev system in accordance with at least some embodiments of the present disclosure.

FIG. 2 depicts a schematic top perspective view of an inspection tool comprising a maglev system in accordance with at least some embodiments of the present disclosure. The one or more carts 104 are disposed on or above the table 206 and configured to move about the table 206 to various processing positions. For example, when in a loading position 208, the one or more carts 104 are loaded with a batch of the plurality of vials 202. The one or more carts 104 are moved to selectively align each of the one or more carts 104 to an inspection position 210. When each of the one or more carts are in an unloading position 212, the batch of the plurality of vials 202 disposed therein are unloaded. Each of the one or more carts 104 includes a vial holder 216 configured to hold the batch of the plurality of vials 202. The vial holder 216 may hold the batch of the plurality of vials 202 in a linear array. Each vial holder 216 is configured to spin the batch of the plurality of vials 202 on their own respective axes. In some embodiments, the batch of the plurality of vials 202 comprises about 8 to about 12 vials. In some embodiments, the one or more carts 104 comprise about 4 to about 8 carts. The one or more carts 104 may generally move in a clockwise or counter-clockwise direction about the table 206. For example, the one or more carts 104 may be configured to move from a position on the table 206 to a next position every about 0.5 seconds to about 1.5 seconds.

The camera 150 is configured to take images of the plurality of vials 202 when the plurality of vials 202 are disposed in the inspection position 210. The camera 150 may be any suitable camera, for example, a CMOS camera, a CCD camera, or the like. The camera 150 may be configured to operate in transmission mode, reflection mode, or a combination of transmission and reflection mode. For example, the camera 150 may be configured to process an illumination source that passes, or transmits, through the plurality of vials 202 to the angled mirror 304 to sensors of the camera 150 to generate images (i.e., transmission mode). The camera 150 may also be configured to process light from any source that passes to the plurality of vials and reflects back to the camera 150 via the angled mirror 304 (i.e., reflection mode).

In some embodiments, the camera 150 may be configured to capture a single image of a batch of all of the plurality of vials 202 disposed in the inspection position 210. In some embodiments, the camera 150 may comprise multiples lens and multiple sensors. The camera 150 may be coupled to the controller 140 of the inspection tool 100 to analyze and process image data to identify impurities or defects internal to each of the plurality of vials 202. In some embodiments, the camera 150 is stationary. In some embodiments, the camera 150 is fixed to a support rail 236 disposed above the table 206. In some embodiments, the camera 150 is disposed on the table 206. In some embodiments, the camera 150 is disposed off of the table 206 and facing the plurality of vials 202 that are in the inspection position 210.

In some embodiments, the table 206 comprises a maglev system 250 having one or more magnets 252 disposed below the table 206 and configured to move the one or more carts 104 disposed on or over the table 206. In such embodiments, the one or more carts 104 are slidingly disposed on the table 206. In some embodiments, each of the one or more carts 104 have a base 244 made of a magnetic material. The maglev system 250 may comprise any suitable configuration of magnets to slidingly move or elevate and slidingly move the one or more carts 104 above the table 206. For example, in some embodiments, at least some of the one or more magnets 252 may be orientated such that the base 244 of each of the one or more carts 104 is repelled by the at least some of the one or more magnets 252, thereby elevating the base 244 above the table 206. In some embodiments, each base 244 moves with corresponding magnets of the one or more magnets 252 disposed below each base 244. The one or more magnets 252 may be permanent magnets, electromagnets, or the like.

The first transfer robot 115 may comprise an arm 222 coupled to a holder 224. The holder 224 may comprise a bar configured to hold and transfer a batch of the plurality of vials 202. The arm 222 may move from the vial input line 110 to a desired location over the table 206 to place the batch of the plurality of vials 202 to a desired cart of the one or more carts 104. The holder 224 may clamp or otherwise hold the batch of the plurality of vials 202. In some embodiments, the holder 224 is configured to hold the batch of the plurality of vials 202 in a linear array. In some embodiments, the holder 224 is configured to hold the batch of the plurality of vials 202 with a same spacing between adjacent vials as the vial holder 216 for ease of transfer from the first transfer robot 115 to the plurality of carts 104. The second transfer robot 125 may comprise an arm 232 and a holder 234 that function similar to the arm 222 and the holder 224 of the first transfer robot 115.

Figures 3, 4:
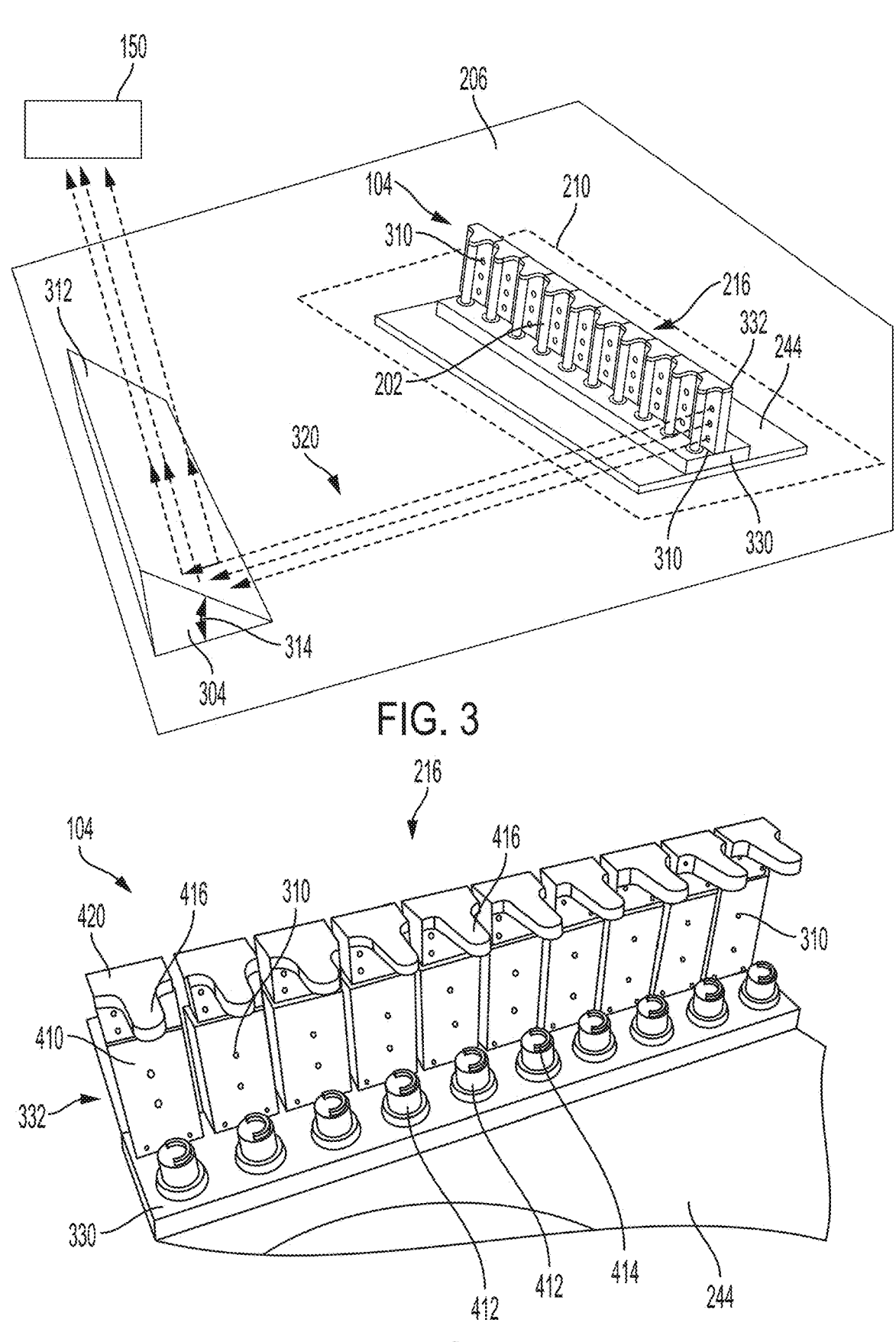
FIG. 3 depicts an isometric view of a portion of an inspection tool with a cart disposed in an inspection position in accordance with at least some embodiments of the present disclosure.
FIG. 4 depicts an isometric view of a vial holder in accordance with at least some embodiments of the present disclosure.

FIG. 3 depicts an isometric view of a portion of an inspection tool with a cart of the one or more carts 104 disposed in an inspection position 210 in accordance with at least some embodiments of the present disclosure. In some embodiments, the camera 150 is disposed above an angled mirror 304 and configured to take images of the plurality of vials 202 via the angled mirror 304 (e.g., via reflection) when the plurality of vials 202 are disposed in the inspection position 210. In some embodiments, the one or more carts 104 are disposed about the angled mirror 304 and configured to move about the angled mirror 304. In some embodiments, the one or more carts 104 are moved to selectively align each of the one or more carts 104 with the angled mirror 304 to place each cart in the inspection position 210.

In some embodiments, each of the one or more carts 104 includes an illumination source 310 configured to pass a light 320 (i.e., photons of light) directly to the camera 150. In some embodiments, the illumination source 310 is configured to pass the light 320 through a batch of the plurality of vials 202 towards one or more mirrors, for example, the angled mirror 304 so that the light reflects upward from the angled mirror 304 to the camera 150. FIG. 3 depict the light

320 passing through only one of the plurality of vials 202 for ease of view. However, the light 320 would similarly pass through the remainder of the plurality of vials 202. The angled mirror 304 may have a reflection face 312 having an angle 314 with respect to the table 206. The angle 314 may be any suitable angle based on the position of the camera 150 with respect to the inspection position 210. In some embodiments, the angle 314 is about 20 degrees to about 70 degrees.

In some embodiments, the vial holder 216 includes a base plate 330 and a back plate 332 extending upward from the base plate 330. In some embodiments, the illumination source 310 is disposed in the back plate 332. In some embodiments, the back plate 332 may be a unibody plate. The illumination source 310 may comprise one or more beams of light from behind each vial disposed in the vial holder 216. In some embodiments, the illumination source 310 may comprise a plurality of LED light sources.

FIG. 4 depicts an isometric view of a vial holder 216 in accordance with at least some embodiments of the present disclosure. In some embodiments, the vial holder 216 comprises a plurality of rotatable pedestals 412 configured to retain and spin a batch of the plurality of vials. In some embodiments, each of the rotatable pedestals 412 include a wall 414 for retaining each vial therein and preventing each vial from spinning out of the vial holder 216. In some embodiments, the wall 414 is annular. In some embodiments, the wall 414 is shaped as a partial ring. The plurality of rotatable pedestals 412 are configured to spin at high speeds, for example, about 3000 to about 8000 revolutions per minute (RPM).

In some embodiments, the back plate 332 include a plurality of plates 410 that are spaced from each other, with each of the plurality of plates 410 aligned behind respective vials of the plurality of vials 202. In some embodiments, the vial holder 216 includes a plurality of top covers 420 that are rotatable with respect to the back plate 332. In some embodiments, each of the plurality of top covers 420 include a brim 416 extending over the plurality of rotatable pedestals 412. In some embodiments, the brim 416 is narrower than a remainder of the plurality of top covers 420. In some embodiments, the plurality of top covers 420 are configured to rotate such that the brims 416 are not aligned with respective ones of the plurality of rotatable pedestals 412 during loading of the plurality of vials 202 and the brims 416 are aligned with respective ones of the plurality of rotatable pedestals 412 to retain the plurality of vials 202 between the plurality of rotatable pedestals 412 and the respective brims 416. In some embodiments, the vial holder 216 is configured to hold or arrange a batch of the plurality of vials 202 linearly on the one or more carts 104 to advantageously allow for batch imaging of the plurality of vials 202.

Figure 5:
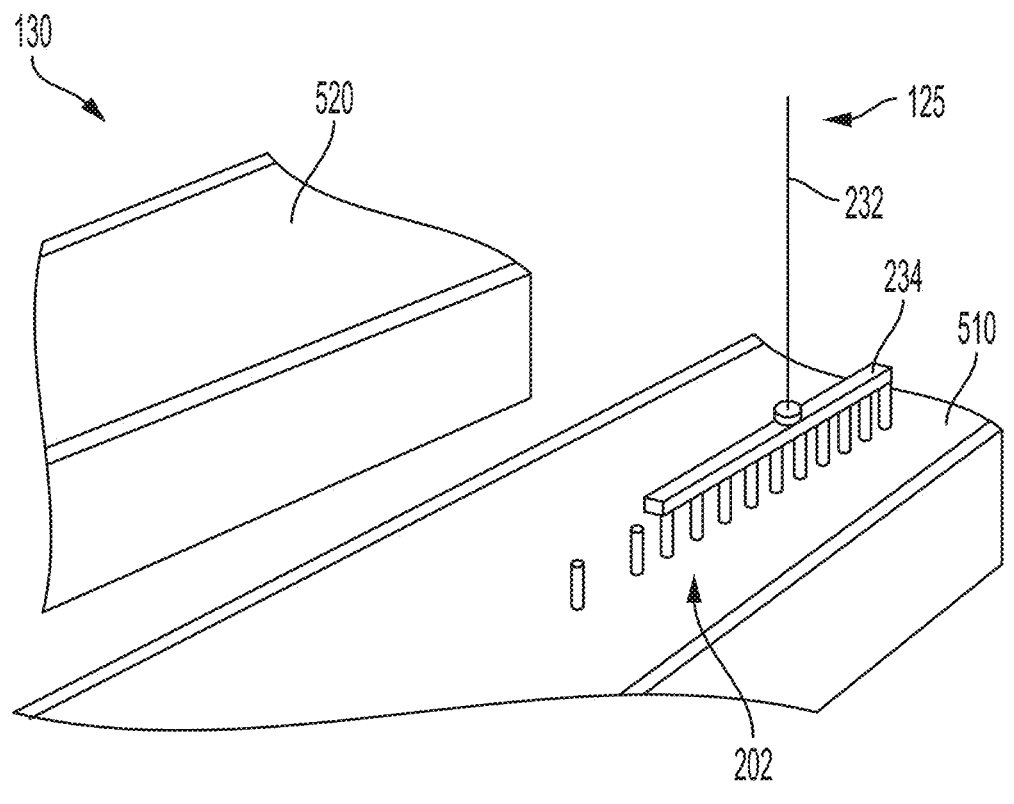
FIG. 5 depicts an isometric view of an output line in accordance with at least some embodiments of the present disclosure.

FIG. 5 depicts an isometric view of vial output line 130 in accordance with at least some embodiments of the present disclosure. In some embodiments, the vial output line 130 includes a pass line 510 and a fail line 520. In some embodiments, the holder 234 of the second transfer robot 125 may be configured to selectively hold and release individual vials. For example, the second transfer robot 125 may be configured to release vials of the plurality of vials 202 that pass inspection onto the pass line 510. The second transfer robot 125 may be configured to release vials of the plurality of vials 202 that fail inspection onto the fail line 520.

Figure 6:
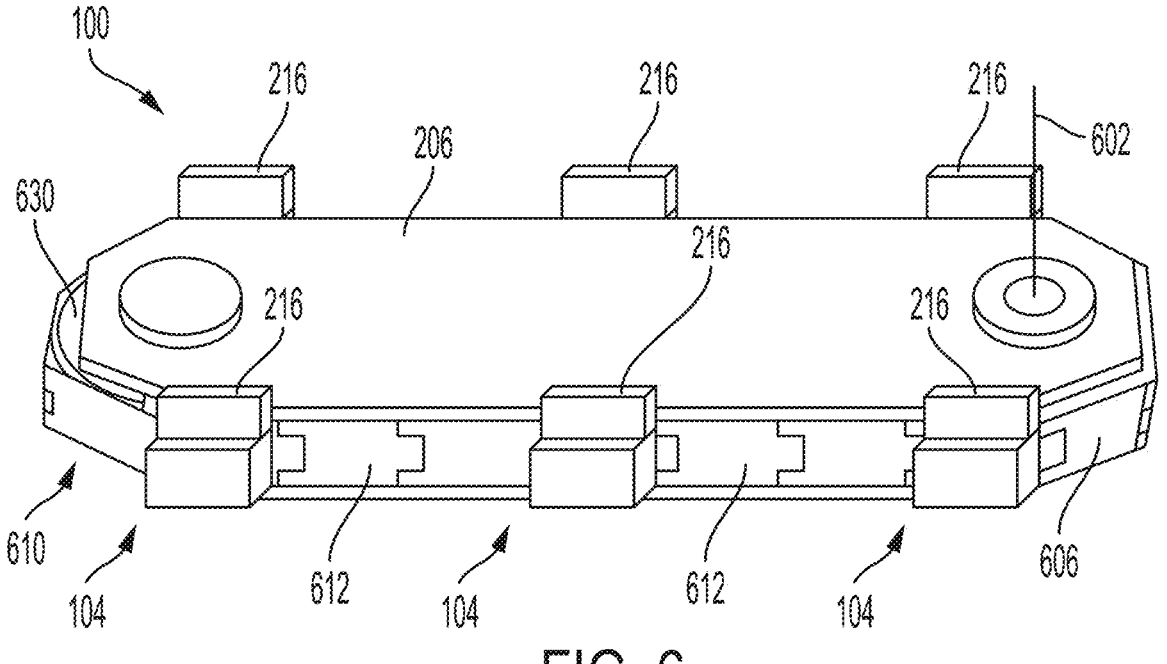
FIG. 6 depicts a schematic view of an inspection tool comprising an oval conveyor system in accordance with at least some embodiments of the present disclosure.
Figure 7:
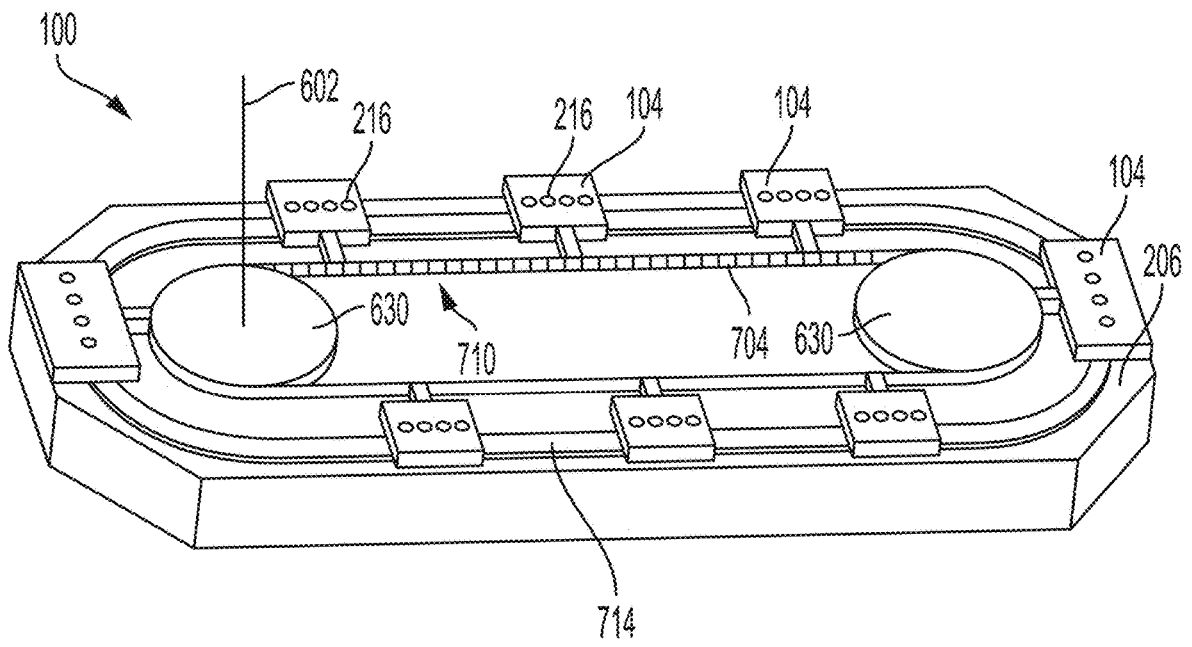
FIG. 7 depicts a schematic view of an inspection tool comprising an oval conveyor system in accordance with at least some embodiments of the present disclosure.

FIG. 6 depicts a schematic view of an inspection tool 100 comprising a conveyor system 610 having an oval shape in accordance with at least some embodiments of the present disclosure. FIG. 7 depicts a schematic view of an inspection tool 100 comprising a conveyor system 710 having an oval shape in accordance with at least some embodiments of the present disclosure. The inspection tool 100 comprising the conveyor system 610 or the conveyor system 710 is similar to the inspection tool 100 comprising the maglev system 250 except that instead of magnets, the conveyor system 610 uses mechanical means to rotate or move the one or more carts 104. The other components of the inspection tool 100 discussed above with respect to FIGS. 2 through 5 are also applicable in use with the conveyor system 610 and the conveyor system 710.

The conveyor system 610 generally includes a motor 602 and a drive chain 606 coupled to the motor 602. In some embodiments, the drive chain 606 comprises a closed loop link system having a plurality of links 612 that rotate about the table 206. In some embodiments, the one or more carts 104 are coupled to the conveyor system 610 (e.g., via outside surfaces of selective ones of the plurality of links 612) and configured to move about the table 206 via the drive chain 606. In some embodiments, the drive chain 606 rotates about one or more wheels 630.

The conveyor system 710 generally includes the motor 602 and a drive chain 606 comprising a drive belt 704. The drive belt 704 may rotate about the one or more wheels 630. The one or more carts 104 are coupled to the drive belt 704 and rotate about the table 206 via the drive belt 704. In some embodiments, the conveyor system 710 includes a rail 714 disposed on the table 206. The one or more carts 104 may be disposed on and guided by the rail 714. While the conveyor system 610 and the conveyor system 710 provide embodiments of mechanical means to rotate or move the one or more carts 104, other such mechanical means to rotate or move the one or more carts 104, for example, via belts, gears, motors, actuators, or the like, are within the scope of the present principles.

Figure 8:
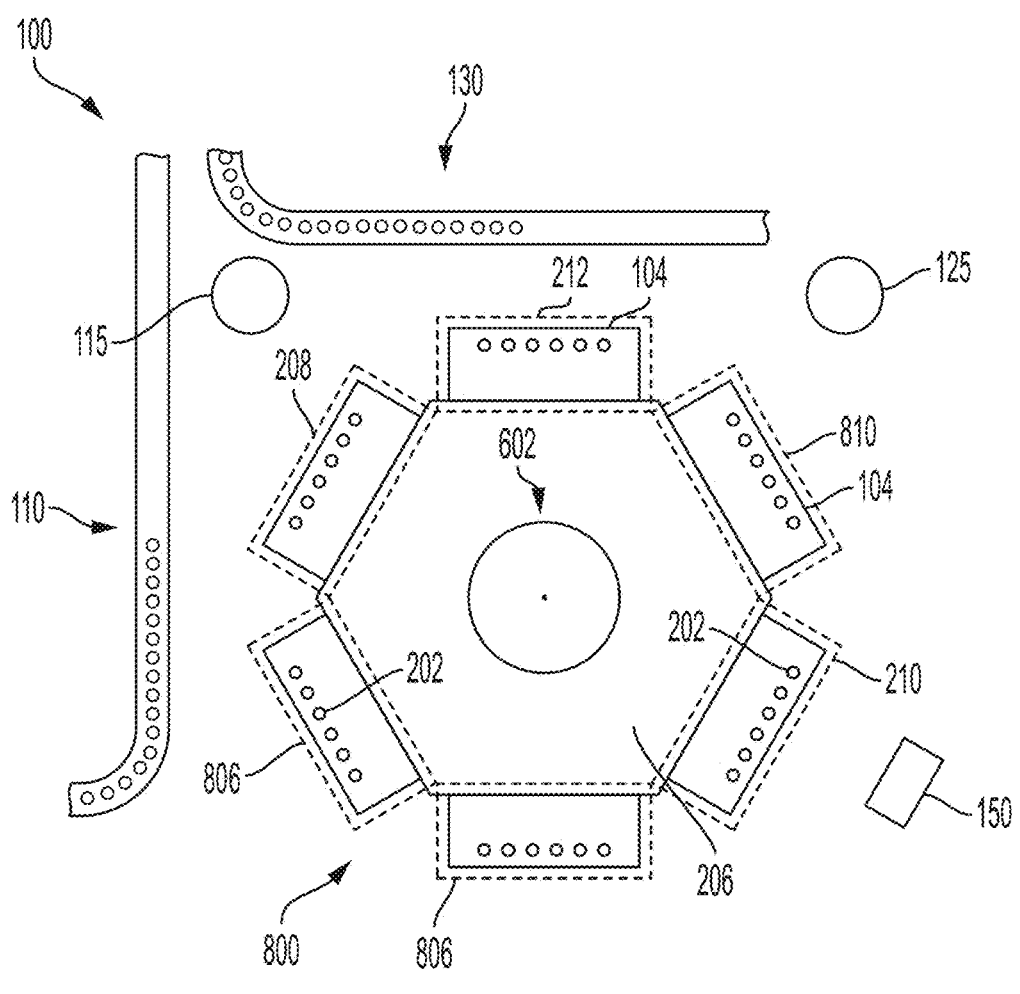
FIG. 8 depicts a schematic top view of an inspection tool comprising a circular conveyor system in accordance with at least some embodiments of the present disclosure.

FIG. 8 depicts a schematic top view of an inspection tool comprising a conveyor system 800 having a circular shape in accordance with at least some embodiments of the present disclosure. In some embodiments, the motor 602 is coupled to the table 206 and rotates the table 206. In some embodiments, the one or more carts 104 are coupled to the table 206 and rotate with the table 206 via the motor 602. In some embodiments, the motor 602 is configured to rotate the table 206 without a drive chain. In some embodiments, the camera 150 is disposed off of the table 206 and configured to point at the plurality of vials 202 disposed in the inspection position 210.

In some embodiments, the one or more carts 104 are disposed in a spinning position 806. In some embodiments, the spinning position 806 is disposed between the loading position 208 and the inspection position 210 along the path of the one or more carts 104. In some embodiments, the inspection module 120 includes multiple ones of the spinning positions 806. In some embodiments, the inspection module 120 includes a data processing position 810. The one or more carts 104 may be disposed in the data processing position 810 after the inspection position 210 and before the unloading position 212. The data processing position 810 advantageously may provide a holding area for the plurality of vials disposed therein while the inspection tool 100 determines whether each vial passes or fails inspection.

Figures 9A, 9B:
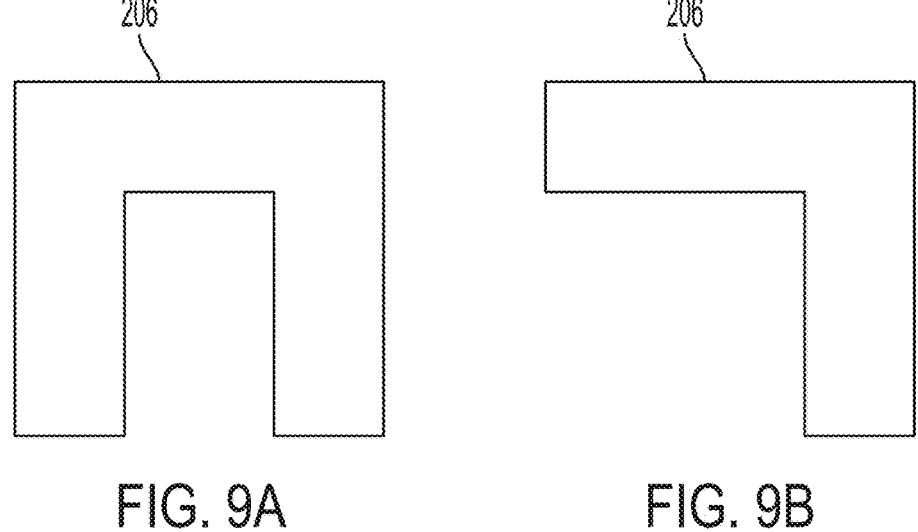
FIG. 9A depicts a schematic view of a table layout of an inspection tool in accordance with at least some embodiments of the present disclosure.
FIG. 9B depicts a schematic view of a table layout of an inspection tool in accordance with at least some embodiments of the present disclosure.

FIG. 9A depicts a schematic view of a table layout of an inspection tool 100 in accordance with at least some embodiments of the present disclosure. FIG. 8B depicts a schematic view of a table layout of an inspection tool 100 in accordance with at least some embodiments of the present disclosure. The table 206 may be any suitable shape. For example, in some embodiments, the table 206 of the inspection module 120 is rectangular shaped, as shown in FIG. 2. In some embodiments, the table 206 may be oval or round shaped as shown in FIGS. 6 and 7. In some embodiments, the table 206 may have polygonal shape, for example, a hexagon as shown in FIG. 8. The table 206 may be any other suitable shape. In some embodiments, the table 206 is U-shaped, as depicted in FIG. 9A. In some embodiments, the table 206 is L-shaped, as depicted in FIG. 9B.

FIG. 10 depicts a flow chart of a method 1000 of inspecting a plurality of vials (e.g., plurality of vials 202) for impurities in accordance with at least some embodiments of the present disclosure. At 1002, the method 1000 includes using a first transfer robot (e.g., first transfer robot 115) to load a plurality of vials at least partially filled with liquid from a vial input line (e.g., vial input line 110) to a cart (e.g., one or more carts 104) disposed in an inspection module (e.g., inspection module 120). In some embodiments, the cart is coupled to, disposed on, or disposed above the inspection module or a table (e.g., table 206) of the inspection module. In some embodiments, the plurality of vials comprises 8 or more vials. The plurality of vials may comprise any suitable container for carrying a parenteral fluid. For example, the plurality of vials may comprise glass containers, syringes, ampoules, cartridges, or the like.

At 1004, the method 1000 includes spinning each of the plurality of vials in the cart about their own respective axes. In some embodiments, spinning each of the plurality of vials in the cart is performed at about 4000 to 8000 rotations per minute. In some embodiments, the plurality of vials are held and spun via a vial holder (e.g., vial holder 216). At 1006, the method 1000 includes moving the cart about the table of the inspection module to place the cart in an inspection position (e.g., inspection position 210) for a first duration. In some embodiments, the cart is stationary during the first duration. In some embodiments, the inspection position is aligned with desired faces of one or more mirrors, for example, a reflection face (e.g., reflection face 312) of an angled mirror (e.g., angled mirror 304) disposed on the table.

At 1008, the method 1000 includes taking a plurality of images via a camera (e.g., camera 150) of each of the vials within the first duration. In some embodiments, the camera may take the plurality of images in a direct line of sight. In some embodiments, the camera may take the plurality of images via one or more mirrors, providing an indirect line of sight to the plurality of vials. In some embodiments, the first duration is about 0.5 to about 1.0 second. In some embodiments, a light source (e.g., illumination source 310) is configured to direct light from the cart, through the plurality of vials, prior to taking the plurality of images. In some embodiments, the light source may be directed to camera via the one or more mirrors. The plurality of images may be used by the controller 140 or other processor to analyze and classify each vial as passing or failing inspection. Each vial may further be classified based on what type of defect is identified in the vial. In some embodiments, the method 1000 includes stopping the spinning of each of the plurality of vials in the cart prior to taking the plurality of images. The spinning of the plurality of vials may be stopped before or after placing the cart in the inspection position.

In some embodiments, the method 1000 includes characterizing each of the plurality of vials as passing inspection or failing inspection after taking the plurality of images. In some embodiments, a second transfer robot (e.g., second transfer robot 125) may unload any of the plurality of vials that pass inspection onto a pass line (e.g., pass line 510) and any of the plurality of vials that fail inspection onto a fail line (e.g., fail line 520).

In some embodiments, the first transfer robot may load additional batches of vials from the vial input line onto additional carts of the inspection module for inspection. The cart, along with any additional carts, may be moved about the inspection module in a clockwise or counterclockwise direction to provide continuous inspection and processing of vials. For example, the cart may be moved via the maglev system 250, the conveyor system 610, the conveyor system 710, the conveyor system 800, or the like.

In some embodiments, the first transfer robot may load a second plurality of vials (e.g., a second batch of the plurality of vials 202) at least partially filled with liquid from the vial input line to a second cart (e.g., a second one of the one or more carts 104) disposed in the inspection module. In some embodiments, the second cart is coupled to, disposed on, or disposed above the inspection module. The method 900 may include spinning each of the second plurality of vials in the second cart and then moving the cart and the second cart either clockwise or counterclockwise about the table to align the second cart with the angled mirror in the inspection position. The spinning of each of the second plurality of vials is stopped in the second cart prior to taking a plurality of images of each of the vials in the second plurality of vials within the first duration via the angled mirror.

While the foregoing is directed to embodiments of the present disclosure, other and further embodiments of the disclosure may be devised without departing from the basic scope thereof.

The invention claimed is:

1. An inspection tool for inspecting impurities in vials, comprising:
    a table;
    a conveyor system having a motor;
    a plurality of carts coupled to the conveyor system and disposed outward of a perimeter of the table and configured to move with respect to and around the table via the motor to selectively place each of the plurality of carts in an inspection position, wherein the plurality of carts are coupled to corresponding ones of a plurality of links, wherein the plurality of links are removably coupled to each other to form a closed loop, wherein each of the plurality of carts includes a vial holder configured to hold a plurality of vials, wherein each vial holder includes a plurality of pedestals configured to spin the plurality of vials on their own respective axes, and wherein each vial holder includes a plurality of top covers disposed above the plurality of pedestals and configured to move such that the plurality of top covers are not aligned with respective ones of the plurality of pedestals during loading of the plurality of vials; and
    a camera configured to take an image of at least one of the plurality of vials of a corresponding cart of the plurality of carts when the corresponding cart is disposed in the inspection position.

2. The inspection tool of claim 1, wherein the conveyor system includes a drive chain coupled to the motor, wherein the plurality of carts are configured to move via the drive chain.

3. The inspection tool of claim 2, wherein the drive chain includes the plurality of links and the plurality of carts are coupled to outside surfaces of the plurality of links.

4. The inspection tool of claim 2, wherein the drive chain is coupled to the motor via one or more gears.

5. The inspection tool of claim 1, wherein the plurality of carts are configured to move together in a clockwise or counter-clockwise direction via the motor.

6. The inspection tool of claim 1, further comprising an angled mirror, and wherein the camera is configured to take the image of the at least one of the plurality of vials via the angled mirror.

7. The inspection tool of claim 1, wherein the vial holder comprises a base plate having the a plurality of pedestals configured to retain the plurality of vials, wherein the base plate comprises a lowermost surface of the plurality of carts.

8. The inspection tool of claim 7, wherein each top cover of the plurality of top covers is configured to rotate above the base plate.

9. The inspection tool of claim 1, wherein the corresponding cart is stationary in the inspection position while the image is taken.

10. The inspection tool of claim 1, further comprising an illumination source configured to pass light through the plurality of vials, wherein the illumination source is disposed between the plurality of vials and the plurality of links.

11. The inspection tool of claim 1, wherein the vial holder is configured to arrange the plurality of vials linearly on the plurality of carts.

12. A method of inspecting a plurality of vials for impurities, comprising:
    loading a first plurality of vials at least partially filled with liquid from a vial input line to a cart of a plurality of carts;
    rotating the plurality of carts along a path disposed outward of a perimeter of a table that is stationary, wherein the plurality of carts are coupled to corresponding ones of a plurality of links, wherein the plurality of links are removably coupled to each other to form a closed loop;
    spinning each of the first plurality of vials in the cart about their own respective axes;
    moving the cart via a motor to place the cart in an inspection position for a first duration, wherein the cart is stationary during the first duration;
    illuminating the first plurality of vials via an illumination source disposed between the plurality of vials and the plurality of links; and
    taking an image of at least one of the first plurality of vials within the first duration with a camera.

13. The method of claim 12, further comprising:
    characterizing each of the plurality of vials as passing inspection or failing inspection after taking the image; and
    using a second transfer robot to unload any of the plurality of vials that pass inspection onto a pass line and any of the plurality of vials that fail inspection onto a fail line.

14. The method of claim 12, further comprising stopping the at least one of the plurality of vials in the cart prior to taking the image.

15. The method of claim 12, further comprising:
    directing light from the cart to the camera through the at least one of the plurality of vials prior to taking the image.

16. The method of claim 12, wherein the first duration is about 0.5 to about 1.0 second.

17. The method of claim 12, wherein the plurality of vials comprise glass containers, syringes, or ampoules.

18. The method of claim 12, wherein spinning each of the plurality of vials in the cart is performed at about 4000 to 8000 rotations per minute.

19. The method of claim 12, further comprising:

using a first transfer robot to load a second plurality of vials at least partially filled with liquid from the vial input line to a second cart of the plurality of carts;

spinning each of the second plurality of vials in the second cart;

moving the cart and the second cart either clockwise or counterclockwise via the motor to place the second cart in the inspection position;

holding the second cart in the inspection position for the first duration; and taking an image of at least one of the second plurality of vials within the first duration with the camera.

20. A non-transitory computer readable medium having instructions stored thereon that, when executed, causes a method of inspecting a plurality of vials for impurities to be performed, the method comprising:

loading a first plurality of vials at least partially filled with liquid from a vial input line to a cart of a plurality of carts;

rotating the plurality of carts along a path disposed outward of a perimeter of a table that is stationary, wherein the plurality of carts are coupled to corresponding ones of a plurality of links, wherein the plurality of links are removably coupled to each other to form a closed loop;

spinning each of the first plurality of vials in the cart about their own respective axes;

moving the cart via a motor to place the cart in an inspection position for a first duration, wherein the cart is stationary during the first duration;

illuminating the first plurality of vials via an illumination source disposed between the plurality of vials and the plurality of links; and taking an image of at least one of the first plurality of vials within the first duration with a camera.

\* \* \* \* \*